United States Patent [19]
Bleszinski, Jr. et al.

[11] Patent Number: 4,977,046
[45] Date of Patent: Dec. 11, 1990

[54] LITHIUM BATTERIES

[75] Inventors: Walter Bleszinski, Jr., Andover; Alan H. Bruder, Burlington, both of Mass.

[73] Assignee: Polaroid Corporation, Cambridge, Mass.

[21] Appl. No.: 372,158

[22] Filed: Apr. 26, 1982

[51] Int. Cl.$^5$ ............................................. H01M 6/14
[52] U.S. Cl. .................................... 429/194; 429/218
[58] Field of Search .................... 429/194.4, 218, 224; 428/207

[56] References Cited

U.S. PATENT DOCUMENTS 4,297,231 10/1981 Kahara et al. ................... 429/224

FOREIGN PATENT DOCUMENTS 0086463 7/1981 Japan ................................. 429/218

Primary Examiner—Melvyn J. Andrews
Attorney, Agent, or Firm—Gaetano D. Maccarone

[57] ABSTRACT

Electrical cells and batteries comprising cathodes formed as slurries of MnO$_2$ and carbon in an organic solution of electrolyte in contact with a copper substrate, and sheet lithium anodes adhered to either a conductive plastic or a roughened copper substrate.

9 Claims, 3 Drawing Sheets

LITHIUM BATTERIES

BACKGROUND OF THE INVENTION

This invention relates to electrical batteries, and particularly to a novel lithium battery of one or more cells.

Lithium batteries have been long known to have potentially superior qualities, such as tolerance for low temperature, high energy density, and long shelf life, but have hitherto been adopted for use only in limited quantities and for highly specialized applications. As pointed out in an article entitled "Focus On Lithium Batteries: High Energy For Critical Needs", *Electronic Design*, Dec. 10, 1981, pp. 183-198, at page 183, the reasons for this limited acceptance have been simple, but compelling; conventional lithium batteries are very expensive, and have a reputation for being dangerous.

The conventional approach to the design and construction of lithium batteries revolves about a conception of the battery as a single cell encapsulated in a metal container, as of nickel plated steel, and comprising a lithium disc formed integral with a grid of nickel plated steel, or stainless steel, as a current collector. The cathode is a solid pressed pellet of any of various reductants held in a metal cup, as by a metal ring. Such a construction is described, for example, in U.S. Pat. No. 3,853,627. This arrangement has manifest advantages in protecting the cell from mechanical damage; in preventing interactions between potentially reactive components of the atmosphere, such as $O_2$, $N_2$, $CO_2$, $H_2$ and $H_2O$, and the chemically active cell components; and in ameliorating to some degree the consequences of pressure generated within the cell, either by volatile electrochemical constituents such as $SO_2$, or by gases formed in secondary reactions between cell components and contaminants that are formed during storage or are not adequately excluded or removed during cell manufacture. However, the provisions made in this way to ensure cell integrity have significant attendant disadvantages; notable among these are the complexity and consequent cost of the construction, and the potential for explosion caused by excessive internal gassing, internal contaminants, misuse or improper disposal techniques. The potential for explosion is inherent in the use of the rigid metal cell container; i.e., in the very expedient adopted to minimize the probability of potentially explosive reactions.

Recent advances in lithium batteries are described in the following copending U.S. Applications for Letters Patent, filed on Jan. 20, 1982, by Alan H. Bruder and assigned to the assignee of this invention, all of which are hereby incorporated herein by reference in their entireties:

U.S. application Ser. No. 340,990, for Hermetically Sealed Lithium Batteries; U.S. application Ser. No. 341,195 for Lithium Batteries With Organic Slurry Cathodes; U.S. application Ser. No. 341,196 for Laminar Multicell Lithium Batteries; and U.S. application Ser. No. 341,197 for Lithium Batteries With Laminar Anodes.

The objects of this invention are to simplify the construction and improve the reliability of lithium batteries.

The use of organic slurry cathodes, as described in the above cited U.S. application Ser. No. 341,195, has been found to alleviate many of the problems encountered with pressed bound cathode pellets, the conventional alternative. Basically, the organic slurry cathode comprises a slurry of $MnO_2$ and carbon in a solution of a lithium salt in an organic solvent. In order to obtain the requisite solubility and ionic activity for the lithium salts used as electrolytes in lithium systems, organic solvents of considerable solvent power, such as propylene carbonate, 1,2 dimethoxyethane, and the like, are conventionally employed. As noted in the above cited U.S. application Ser. No. 341,196, such solvents appear to have the ability to permeate the conductive plastic intercell connectors used to isolate the active cell components electrochemically while providing a low impedance path for electronic conduction. This permeation is not sufficiently marked to be characterized by any appreciable solvation or swelling of the conductive plastic, and has in fact been deduced to occur only from the phenomenon of an impedance buildup in batteries in which a conductive plastic boundary was employed to separate an organic slurry cathode from a lithium anode. As described in the above cited application Ser. No. 341,196, this tendency can be prevented by sandwiching a metal solvent barrier between layers of conductive plastic, to form a solvent impermeable intercell connector. However, it has now been found that over a period of time at normal temperatures, or much more rapidly at elevated temperatures in the neighborhood of 120° F., the solvents used in the organic slurry cathode show a tendency to weaken or destroy the adhesive bond between conductive plastic laminae, in contact with the slurry and used for electrochemical isolation, and adjacent metal foil laminae used either as solvent barriers or, for their electrical conductivity and mechanical strength, as external electrical terminals.

There are great practical difficulties involved in the resolution of the problem posed by an unfavorable interaction between the organic solvent employed in the cathode slurry and the conductive plastic-metal interface. At this interface, a conductive plastic adhesive is employed, because an adequate degree of adhesion between the conductive plastic and the metal foil, of aluminum, tinned steel or the like, cannot otherwise be attained. The desired degree of adhesion is attained by including small amounts of reactive functional groups in the adhesive to promote adhesion to the metal foil layer. These groups are speculated to be selectively affected by the potent organic solvent.

The alternative, of eliminating the conductive plastic and placing the cathode slurry directly in contact with the metal foil terminal, is only superficially attractive because the various functions well performed by the conductive plastic are antithetic to the normal metallic nature. In particular, the conductive plastic is relied upon for adhesion to the cathode slurry sufficient to provide a low impedance electronic bond; for adhesion to adjacent thermoplastic components sufficient to provide a liquid impermeable seal around the periphery of the wet active cell components; and to provide electrochemical isolation between the electrochemically active components of the cells and external metallic components or adjacent active cell components. Most of the metals fail in one or all of these desired attributes, and only such exotic and inordinately expensive metals as gold, silver and platinum are sufficiently inert electrochemically to warrant the appellation "inert". Some of the stainless steels are sufficiently inert to warrant consideration from that standpoint alone, but lack adequate adhesive properties and are too costly for use in most applications. Tinned steel, while readily available and sealable, is not sufficiently inert, tending to form destructive couples with the MnO₂ in the cathode. Such metals as aluminum and zinc are far too active for consideration.

In accordance with this invention, it has been found that copper, while too active for use in a conventional lithium-MnO₂ cell, can be employed as the substrate in contact with an organic slurry cathode comprising MnO₂ if the assembled cell is subjected to a preliminary discharge, in the manner and for the purpose described in the above cited application Ser. No. 340,990, soon after electrochemical assembly; i.e., within a few minutes or hours after electrochemical assembly of the cell. Preferably, the copper used as the substrate in contact with the slurry in accordance with the invention is extended out into the seal area surrounding the active components of the cell or cells, to preclude or inhibit the migration of the organic solvent in the cathode slurry into regions in which it might cause problems. In addition, the copper employed is preferably a copper foil having one or preferably both surfaces treated by conventional techniques to promote adhesion to adjacent substrates, as in the manners described in U.S. Pat. Nos. 3,220,897; 3,293,109; and 3,699,018; for example.

Lithium anodes for use with cathode slurries on copper substrates in accordance with the invention may be of conventional construction. Alternatively, in accordance with a novel aspect of the invention, preferred anodes may be constructed by laminating lithium directly to a surface of a copper foil treated to promote adhesion, with the result that a laminar battery containing no conductive plastic components may be constructed.

The practice of the invention will best be understood in the light of the following description, together with the accompanying drawings, of various illustrative embodiments thereof.

Figure 1:
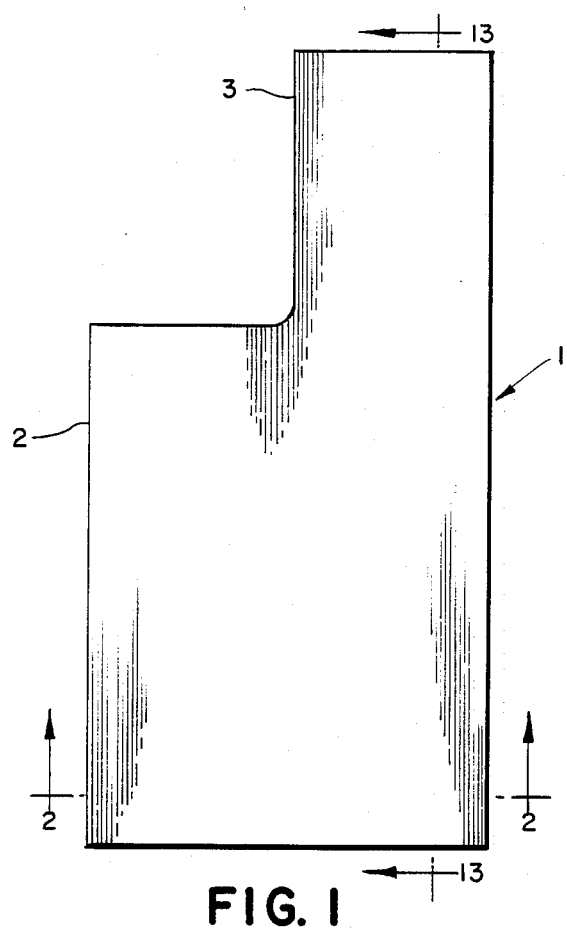
FIG. 1 is a schematic plan sketch of a cathode end plate suitable for use in the construction of batteries in accordance with the invention.
Figure 2:
FIG. 2 is a schematic diagrammatic elevational sketch, with parts shown in cross section, and on an exaggerated vertical scale relative to the horizontal scale, of the end plate of FIG. 1 as seen substantially along the lines 2—2 in FIG. 1.

FIGS. 1 and 2 show a cathode end plate 1 comprising a main body portion 2 and, preferably, a projecting tab portion 3 adapted to be folded around the battery upon final assembly so that both terminals of the battery can be accessible from the same side, as is conventional in the flat battery art. As shown in FIG. 2, the end plate 1 comprises an external layer 4 of a suitable metal for making contact with desired electrical circuitry, and preferably of aluminum or the like, for example, aluminum 1½ mils in thickness, on which a layer of copper 5 is deposited by conventional techniques. This base layer of copper may be about 200 microinches, i.e., about 0.2 mils in thickness. Over this copper base layer 5 is deposited a layer of coral or nodular copper 6, as by any of the techniques discussed in the above cited U.S. Pat. Nos. 3,220,897, 3,293,109 or 3,699,018. U.S. Pat. Nos. 4,073,699; 4,088,544; and 4,113,576 teach methods of making copper foil having a roughened, toothed or nodulated surface of the kind here preferred which may advantageously be considered in the selection of conventional materials for use in the practice of the invention. The surface of the copper so formed comprises minute projections which serve to aid in adhering the surface 6 to adjacent substrates, and in particular to adjacent thermoplastic frame materials and to a cathode slurry deposit on the surface 6 in a manner to be described. A plain copper surface, rather than the nodular copper surface 6, can be employed if desired, but if so, additional care must be exercised to insure adequate adhesion to adjacent thermoplastic sealing components to be described, and a somewhat higher electrical impedance between the surface of the end plate 1 and the organic slurry adherent thereto may be anticipated.

Figure 3:
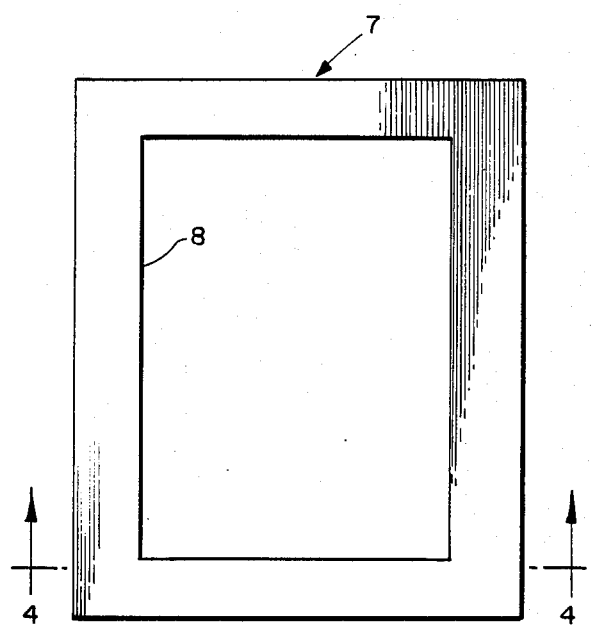
FIG. 3 is a schematic plan sketch of a frame useful in the construction of batteries in accordance with the invention.
Figure 4:
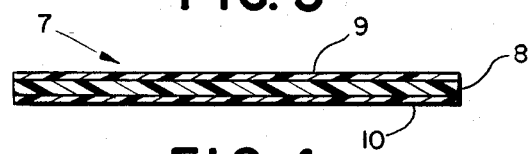
FIG. 4 is a schematic diagrammatic elevational cross-sectional sketch, on a vertical scale enlarged relative to horizontal scale, showing the frame of FIG. 3 as seen substantially along the lines 4—4 in FIG. 3.

FIGS. 3 and 4 show a frame 7 useful in the assembly of batteries in accordance with the invention. As shown in FIG. 3, the frame 7 comprises a generally rectangular member formed with a central aperture 8 within which to receive electrochemical components of the cell in a manner to be described below. The frame 7 may be of any conventional thermoplastic material, preferably one which is adhesive or can be rendered adhesive by the application of heat, pressure or a suitable solvent, and in the present particularly preferred embodiment comprises a central layer 8, for example, of 5 mils in thickness, comprising a poly(vinyl chloride, vinyl acetate) containing about 85% vinyl chloride and 15% vinyl acetate by weight based on the weight of copolymer. On the surfaces of the vinyl layer 8 are deposited adhesive layers 9 and 10, which in accordance with the presently preferred embodiment may comprise Versalon 1140 hot melt polyamide adhesive, as made and sold by General Mills, Inc., of Minneapolis, Minn., or other suitable polyamide or other adhesive known to the art.

Figure 5:
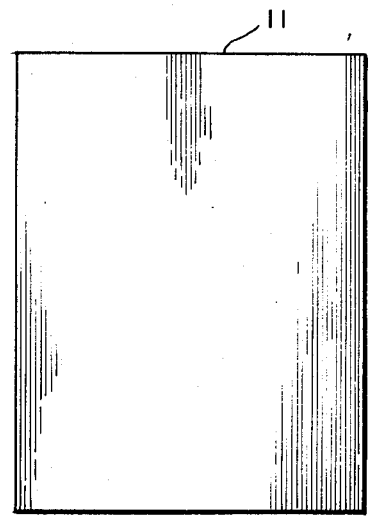
FIG. 5 is a schematic plan view of a separator useful in constructing cells in accordance with the invention, shown approximately to a scale useful with the components of FIGS. 1 and 3.

FIG. 5 shows a separator useful in combination with the other components to be described. The separator 11 may be of any conventional material, of approximately 2-10 mils in thickness. Separators suitable for use in lithium batteries are well known in the art, among those to be considered being polyolefins such as polypropylene, polyethylene, copolymers of propylene and ethylene, mixtures of polyolefins with rubbers such as styrene-butadiene rubber, and the like, together with additives such as $TiO_2$ and the like. A suitable microporous polypropylene separator is sold under the trademark Celgard by Celanese Plastics Co., of Greer, S.C. A presently preferred material is a 2-ml. microporous polyolefin separator material of the kind described in U.S. Pat. No. 4,287,276, which incorporates a non-ionic wetting agent.

Figure 7:
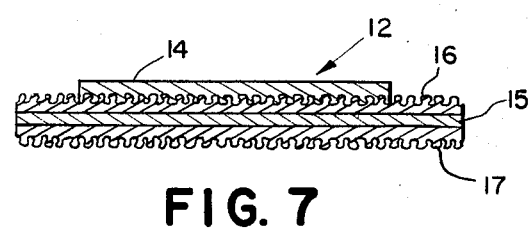
FIG. 7 is a diagrammatic schematic elevational sketch, in cross section, with vertical dimensions greatly exaggerated relative to horizontal dimensions, showing a cross section through the intercell assembly of FIG. 6 substantially as seen along the lines 7—7 in FIG. 6.
Figure 6:
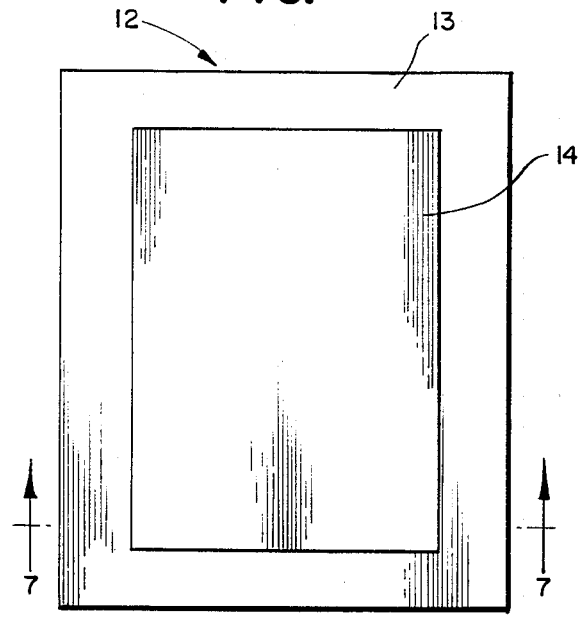
FIG. 6 is a schematic plan sketch of an intercell assembly useful in the manufacture of batteries in accordance with the invention.

FIG. 6 shows an intercell assembly generally designated 12 which essentially comprises a copper sheet 13 on which is laminated a lithium anode 14 of lithium foil, for example, about 2 mils in thickness. The preferred construction of the intercell assembly 12 is shown in FIG. 7 as comprising a central layer 15 of copper, on either side of which are formed nodularized surfaces 16 and 17 of copper prepared in the manner described above to have minute projections suitable for adhering to adjacent substrates. The lithium anode 14 may be laminated directly to one side 16 of this copper structure by the aid of pressure, for example, in the vicinity of 2000 lbs/in.$^2$, which may be applied by calender rolls, or by an hydraulic press or the like. The thicknesses of the copper constituents of the intercell assembly 12 are not especially critical, but, for example, in accordance with the preferred embodiment the central layer 15 of copper was approximately one mil in thickness, and the nodulated layers 16 and 17 on either side were each about 0.3 mils in thickness.

Figure 8:
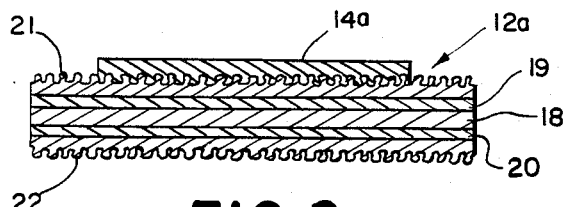
FIG. 8 is a schematic elevational cross-sectional sketch similar to that of FIG. 7, showing an alternative cross-sectional configuration of an intercell assembly useful in the practice of the invention.

FIG. 8 shows an alternative construction 12a for the intercell assembly 12 of FIG. 6, in which the middle substrate comprises a central layer 18 of aluminum, from 1 to 2 mils in thickness, on each side of which are deposited layers 19 and 20 of thin soft copper. Over the layers of copper 19 and 20 are deposited nodular layers of copper 21 and 22, respectively, in the manner described above, and on one of the nodular layers 21 the lithium anode 14a is laminated in the manner described above.

Figure 9:
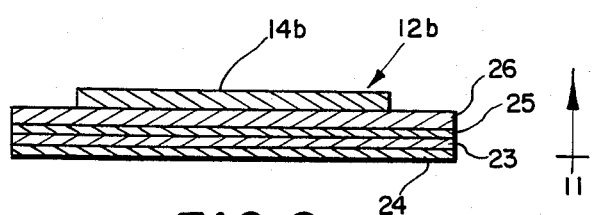
FIG. 9 is a cross-sectional elevational schematic diagrammatic sketch similar to FIGS. 7 and 8, showing another alternative cross-sectional construction for the intercell connector useful in accordance with the invention.

FIG. 9 shows still another alternative construction 12b for the intercell assembly 12, in which, as in the embodiment of FIG. 8, the structure comprises an aluminum substrate 23, which for this purpose can be about 2 mils in thickness, on one side of which is deposited a layer of copper 24. The layer of copper 24 is preferably, but not necessarily, provided with a nodular surface. On the other side of the aluminum layer 23 is a layer 25 of a conductive plastic adhesive primer, to which a layer 26 of conductive plastic, for example of 2 to 6 mils in thickness, is laminated, using the compositions and methods described in the above cited U.S. application Ser. No. 341,197. The lithium anode 14b comprises a lithium foil laminated to the conductive plastic layer 26 in the manner described in application Ser. No. 341,197. For this purpose, as described in that application, the lithium surface adjacent the conductive plastic substrate should be freshly prepared. This precaution is not necessary in the case of the laminations of the lithium foils 14 and 14a in the structures of FIGS. 7 and 8, because the forcible interfacing of the lithium foil with the nodular surface of the copper in those constructions creates so much additional surface that any surface impurities present on the lithium foil make no difference to the strength and electrical conductivity of the laminar bond achieved.

Figure 10:
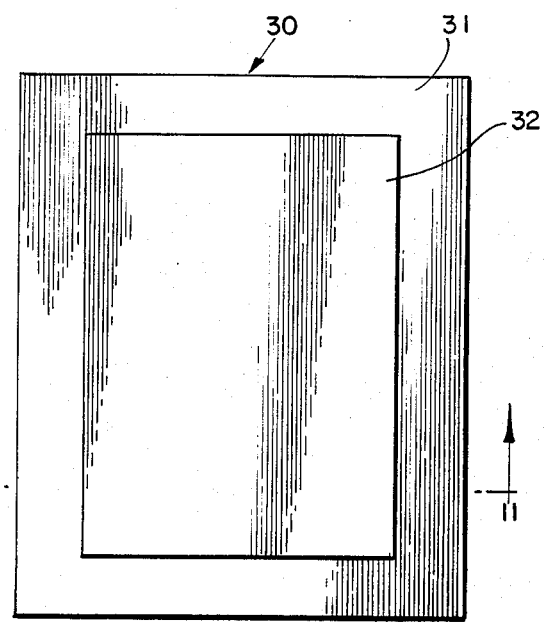
FIG. 10 is a schematic plan sketch of an anode end plate useful in the practice of the invention.
Figure 11:
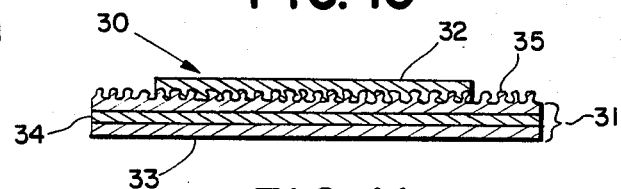
FIG. 11 is a diagrammatic schematic elevational cross-sectional view, with vertical dimensions exaggerated relative to the horizontal dimensions, illustrating the laminar construction of the anode end plate of FIG. 10 as seen substantially along the lines 11—11 in FIG. 10.

FIG. 10 shows an anode end plate 30 suitable for use in the construction of laminar batteries in accordance with the invention, which essentially comprises a metal plate 31 to which is laminated a lithium anode 32. With reference to FIG. 11, showing the present preferred construction, the metallic substrate 31 comprises an outer layer 33 of aluminum, for example, of 1½ mils in thickness, on which is electrically deposited a layer of about 0.2 to 0.4 mils in thickness of soft copper 34. On the copper surface 34 is deposited a layer of nodular copper 35, of the kind described above, to which the lithium anode 32 is laminated by pressure as described above.

Figure 12:
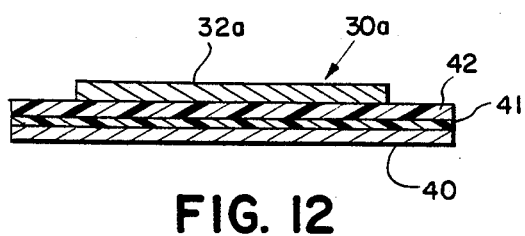
FIG. 12 is a diagrammatic schematic elevational cross-sectional sketch similar to FIG. 11, showing an alternative construction for the anode end plate of FIG. 10.

FIG. 12 shows an alternate construction 30a for the anode end plate 30 which can take the form described in detail in the above cited U.S. application Ser. No. 341,197. This structure takes the form of an aluminum terminal plate 40, for example of 2 mils in thickness, coated with a conductive plastic primer adhesive layer 41 and thereby adhered to a conductive plastic layer 42, for example of 2 to 6 mils in thickness, of the type described in the above cited application no. 341,197. As in that application, the lithium anode 32a may be laminated directly to the surface of the conductive plastic layer 42 without an intermediate adhesive so long as the surface of the lithium adjacent the conductive plastic substrate 42 is freshly exposed just prior to the lamination.

Figure 13:
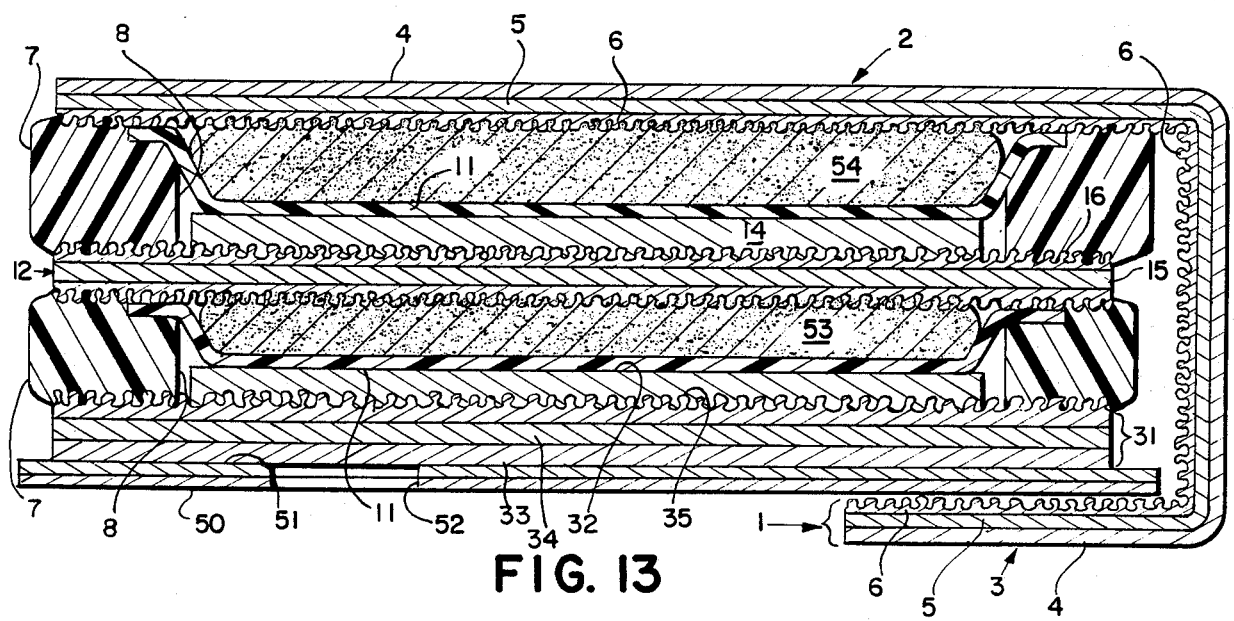
FIG. 13 is a diagrammatic elevational cross-sectional sketch, with vertical dimensions greatly exaggerated with respect to horizontal dimensions, and on an enlarged scale relative to FIGS. 1-11, of a two-cell battery in accordance with the invention.

FIG. 13 shows a two-cell lithium battery constructed in accordance with the preferred embodiment of the invention. The substitution of the alternate components described above for those presently preferred components to be described in connection with FIG. 13 will become apparent those skilled in the art as the description proceeds.

FIG. 13 shows a two cell battery. As will be apparent to those skilled in the art, a single cell battery could be made in the same way by eliminating intercell parts, and batteries of more than two cells could be assembled by simply multiplying the necessary intercell components.

While it is not necessary to the practice of the invention, it is convenient to assemble the battery on an insulating base sheet 50 coated with a suitable layer of adhesive 51. The base sheet may be of any suitable materials, but is preferably of the materials more fully shown and described in U.S. Pat. No. 4,086,400, comprising a laminate of kraft paper, a thermoplastic liquid-impervious resin overlying the paper, and an overlayer on the resin of a heat sealing adhesive.

As shown, the base sheet 50, 51 is provided with an aperture 52 to expose the aluminum metal end terminal collector sheet 33 forming a portion of an anode collector assembly 30 of the kind described above in connection with FIGS. 10 and 11. The metal terminal sheet 33 is preferably laminated to a selected region surrounding the aperture 52 of the adhesive coating 51 on the insulating sheet 50, and to the peripheral borders of the adhesive coating 51 on the sheet 50, but is not necessarily, and preferably is not, laminated to the insulating sheet in other regions.

As indicated in FIG. 13, a first insulating frame 7 of thermoplastic material such as that described above in connection with FIGS. 3 and 4 is laminated to the borders of the toothed side 35 of the copper upper layer of the anode terminal assembly sheet 3, as by heat and pressure, to form a seal surrounding the lithium anode 32 that is laminated to the toothed surface of the copper layer 35 as described above. A separator 11, of the type described above in connection with FIG. 5, is preferably only locally tacked to the periphery of the frame 7 around the borders of the aperture 8 and the frame 7, to allow communication of gases during later vacuum sealing of the battery in a manner to be described.

Over the separator 11 is deposited a first cathode stratum 53 comprising an organic cathode slurry of manganese dioxide and carbon, which may be of any of the formulations described below, or of such equivalent compositions as will occur to those skilled in the art, and which is in conductive contact with the lower copper surface 17 of an intercell connector assembly 12 such as that described above in connection with FIGS. 6 and 7. As shown, the boundaries of the intercell connector 12 extend well into the seal area at the periphery of the frame 7, to minimize and inhibit the flow of any electrolyte solvent from the cathode slurry 53 into other regions of the battery. Overlying the borders of the intercell connector assembly metal sheet 12 is a second frame 7, adhered to the copper side 16 of the intercell connector assembly 12, and provided with an integrally laminated lithium anode 14 as described above in connection with FIGS. 6 and 7.

A second thermoplastic frame 7 is applied over the periphery of the nodulated copper layer 16 of the intercell connector assembly 12, and a second separator 11 is applied over the lithium anode 14 and selectively adhered to portions of the borders of the frame 7 surrounding the aperture 8 in frame 7. A second cathode slurry deposit 54 is applied over the separator 11. The battery assembly is then completed by the addition of a cathode end plate assembly 3, such as that described above in connection with FIGS. 1 to 2, which is sealed around the periphery of the upper side of the thermoplastic frame 7 with the toothed side 6 of the copper substrate serving to promote adhesion by intimate interfacial contact with the thermoplastic adhesive, not separately shown in FIG. 13, overlying the body of the frame 7. As illlustrated, the tab 3 formed on the cathode end plate assembly may be folded around the battery to present a positive terminal on the same side as the negative terminal exposed through the aperture 52 in the insulating base sheet.

Upon assembly in the manner generally described above, which can proceed in more detail as described in the above cited copending applications, the components are preferably heat-sealed about the peripheries under vacuum in the manner described in the above cited copending applications Ser. Nos. 340,990, 341,195, 341,196 and 341,197. The processes as described in those applications, as are other operations in the manufacture and assembly of a battery comprising lithium and organic slurry cathode components, are preferably carried out in a dry atmosphere. The peripheral seals described above are preferably not made in the order in which the components are assembled, but are made following assembly of the components as the battery is being evacuated during the sealing process.

Following assembly of the battery as described above, the battery is preferably subjected to an electrical drain by connecting its terminals across a suitable resistor to drain from one to three percent of the available energy capacity in the manner described in the above cited application Ser. No. 340,990. This process serves to stabilize the battery against gassing, but is also essential to stabilize the battery against unwanted electrochemical couplings developed between the copper in contact with the organic cathode slurry and the $MnO_2$ in the cathode slurry. This matter will be discussed in more detail below.

Cathode slurry deposits such as those shown at 53 and 54 in FIG. 13 are preferably formed as a slurry of manganese dioxide and carbon particles in an electrolyte solution in an organic solvent containing a lithium salt as the ionically conductive species. Suitable cathode slurry compositions comprise from 50 to 100 parts by weight of propylene carbonate and from 0 to 50 parts by weight of 1,2 dimethoxyethane, based on the weight of solvent, as the organic solvent, with $LiAsF_6$ in concentrations of from 0.05 to 2.00 molal, or $LiCLO_4$ in concentrations of from 0.65 to 1.97 molal, as the electrolyte. The electrolyte solution may comprise from 35 to 59 percent by weight, based on the weight of slurry, of a dispersion in a solution of $MnO_2$ and carbon black in weight ratios of $MnO_2$/carbon black of from 8:1/24:1. Various preferred and other suitable compositions of this kind are described in detail in the above cited application Ser. No. 341,195. Other compositions that may be preferred for the lower flash point of the solvent employed comprise the same range of ratios of $MnO_2$ and carbon in an ˜electrolyte solution of the chosen lithium salt in $\gamma$-butyrolactone. Typical compositions suitable for the purpose may include from 45 to 50 parts by weight of $\gamma$-butyrolactone, in which from 6 to 12 parts by weight of $LiAsF_6$ are dissolved, as the organic electrolyte, in which the manganese dioxide and carbon are dispersed in sufficient quantities to form a readily extrudable mixture. As is well known in the art, the particular ratio of $MnO_2$ to carbon is optimized in dependence on the intended current drain environment of the battery, with higher proportions of $MnO_2$ favoring increased capacity, and higher ratios of carbon favoring lower impedance within the bounds stated.

Higher concentrations of the lithium salt in the electrolyte tend to decrease internal impedance, but the relatively high cost of the lithium salt may dictate a preference for a somewhat lower concentration than that electically optimum. A particular composition that is entirely suitable comprises 103.68 gms. of $MnO_2$, 4.32 gms. of carbon, 45.0 gms. of $\gamma$-butyrolactone, and ˙6 gms. of $LiAsF_6$. Such a composition has shown the ability to deliver 1440 milliampere hours to a cutoff voltage of 3.0 volts, and 1312 milliampere hours to 5.0 volts, in two cell batteries of the type described above containing 10 grams of cathode slurry per cell.

While it is not desired to be bound by any theoretical explanation, it is speculated that the stability of batteries constructed as described above with organic slurry cathodes on copper substrates can be rationalized on the following basis:

The exact reaction potentials obtained in practical electrochemical systems are difficult to obtain and are somewhat interdependent. However, in general for the systems here considered the overall cell reaction for a freshly assembled battery can be expressed as:

(1) $Li + MnO_2 \longrightarrow (Li^+)(MnO_2^-)$  +3.62 volts

The lithium reduction potential is given by (2) $Li^+ + e^- \longrightarrow Li$  −3.1 volts Adding reactions (1) and (2), (3) $Li^+ + e^- + MnO_2 \longrightarrow (MnO_2^-)(Li^+)$  +0.52 volts The oxidation potential of copper is given by (4) $\tfrac{1}{2}Cu \longrightarrow e^- + \tfrac{1}{2}Cu^{+2}$  −0.36 volts Adding reactions (3) and (4), (5) $\tfrac{1}{2}Cu + MnO_2 + Li^+ \longrightarrow$  +.16 volts
$(Li^+)(MnO_2^-) + \tfrac{1}{2}Cu^{+2}$ Reaction (5) will proceed spontaneously, and would be highly undesirable from the standpoint of battery stability. However, the reaction in question will proceed rather slowly, so that the battery will be fully operative whether or not any steps are taken to inhibit the reaction for purposes not requiring extended shelf life.

Following the preliminary electrical draining of the battery carried out in accordance with the preferred embodiment of the invention, the overall cell reaction can be expressed as:

(1a) $Li + MnO_2 \longrightarrow (Li^+)(MnO_2^-)$  +3.2 volts

The potential associated with the sum of reactions (1a) and (2) is now (3a) $Li^+ + e^- + MnO_2 \longrightarrow (MnO_2^-)(Li^+)$  +0.1 volts In order for this system to react with copper, the copper would have to be reduced, or become electrically positive with respect to the $MnO_2$, which will not occur spontaneously. Thus, the result of the pre-drain operation is to make the copper cathodic relative to the $MnO_2$, rather than anodic, resulting in a stable electrochemical system.

From the above discussion, it will be apparent that it is not necessary to drain the battery to an OCV (open circuit voltage) of 3.2 volts in order to stabilize it against the copper substrate; any OCV of 3.46 or below would suffice for this purpose. Actually, since the exact potentials involved in a real system are somewhat system dependent, a more precise criterion is that the OCV should be reduced to a value at which the copper will not be oxidized by the $MnO_2$ in the presence of lithium. From the standpoint of inhibiting gassing, however, it is preferred to drain the battery to about the 3.2 volt level.

Figure 14:
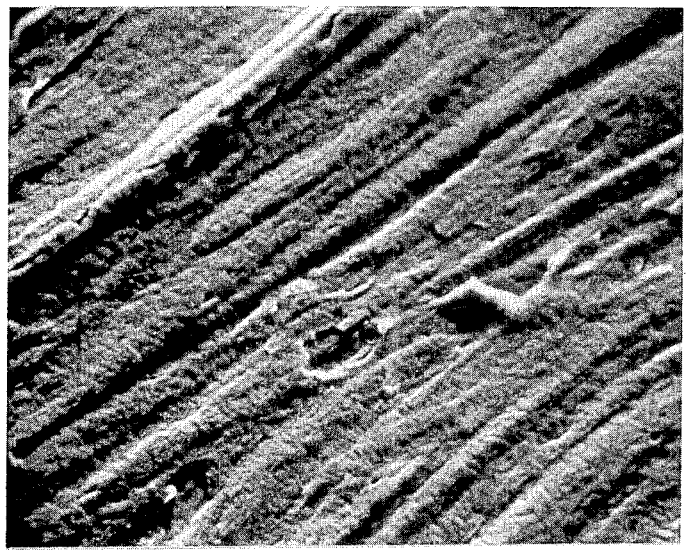
FIG. 14 is an electron micrograph of the surface of a conventional bright copper foil.
Figure 15:
FIG. 15 is an electron micrograph of the surface of a copper foil treated to promote adhesion in accordance with the preferred embodiment of the invention.

FIG. 13 shows the surface of a typical one ounce per square foot bright copper foil. This surface does not adhere well to most substrates without the aid of a specific adhesive; e.g., such as the conductive plastic adhesive employed in embodiments such as that described above in connection with FIG. 12. The difference between this surface and that of a nodulated or toothed surface of the kind here preferred is illustrated in FIG. 15, which is an electron micrograph of the nodulated surface of a preferred form of copper foil as made and sold by Califoil, Inc. of San Diego, Calif. FIGS. 14 and 15 both were made at a magnification of 3000X; the projections, or nodules, in FIG. 15 accordingly occur at a spatial frequency of about 30,000 per linear inch.

While the invention has been described with respect to the details of specific illustrative embodiments, many changes and variations will occur to those skilled in the art upon reading this description, and such may obviously be made without departing from the scope of the invention.

Having thus described the invention, what is claimed is:

1. A battery comprising a cathode slurry of manganese dioxide and carbon in a solution of a lithium salt in an organic solvent in contact with a copper substrate, and a lithium anode, said battery having an OCV below the value at which the copper substrate will be oxidized by the manganese dioxide in the presence of the lithium.

2. A laminar battery, comprising a thin flat sheet of metal, a nodular layer of copper covering one surface of said metal sheet, a cathode slurry deposit of $MnO_2$ and carbon in a solution of a lithium salt in an organic solvent on and in intimate contact with a central region of said nodular copper layer, a separator extending over said cathode slurry deposit, a lithium anode in contact with a central region of said separator on a side of said separator opposite said cathode slurry deposit, and means forming a sealed compartment about said anode, said cathode slurry deposit, and said separator, said battery having an OCV below the value at which the copper will be oxidized by the manganese dioxide in the presence of the lithium.

3. A laminar battery, comprising a first thin sheet of metal foil having a nodulated copper surface formed on one side thereof, a deposit of a slurry of $MnO_2$ and carbon in a solution of a lithium salt in an organic solvent on a central region of said nodular surface, a separator over and in contact with said slurry deposit, a lithium foil anode in contact with said separator on a side of said separator opposite said slurry deposit, said anode being laminated to a central region of a nodular copper surface formed on a second thin sheet of metal foil confronting said first sheet, and a thermoplastic frame between and laminated to said first and second sheets around the peripheries thereof surrounding said anode, said cathode slurry deposit, and said separator, said battery having an OCV below the value at which the copper will be oxidized by the manganese dioxide in the presence of the lithium.

4. A multicell battery comprising cells each having a lithium anode and a $MnO_2$ cathode spaced by a separator and communicating electrochemically through a solution of a lithium salt in an organic solvent, in which the cells are electrochemically isolated and electronically connected together through metal intercell connectors each having opposed nodular copper surfaces in contact with an anode and a cathode of different adjacent cells, said battery having an OCV below the value at which the copper will be oxidized by the manganese dioxide in the presence of the lithium.

5. A laminar battery, comprising a thin flat sheet of metal, a nodular layer of copper covering one surface of said metal sheet, a cathode slurry deposit of $MnO_2$ and carbon in a solution of a lithium salt in an organic solvent on and in intimate contact with a central region of said nodular copper layer, a separator extending over said cathode slurry deposit, a lithium anode in contact with a central region of said separator on a side of said separator opposite said cathode slurry deposit, and means forming a sealed compartment about said anode, said cathode slurry deposit, and said separator, said anode comprising a sheet of lithium foil laminated to and permeating the interstices of a central region of the surface of a substrate of nodulated copper foil, said battery having an OCV below the value at which the copper will be oxidized by the manganese dioxide in the presence of the lithium.

6. The battery of claim 5, in which said sealing means comprises a closed loop of thermoplastic material surrounding said anode, said cathode slurry deposit, and said separator and having opposed surfaces in which the peripheries of the nodulated surfaces of said metal sheet and said copper foil substrate are embedded.

7. A multicell battery comprising cells each having a lithium anode and a $MnO_2$ cathode spaced by a separator and communicating electrochemically through a solution of a lithium salt in an organic solvent, in which the cells are electrochemically isolated and electronically connected together through metal intercell connectors each having nodular copper surfaces, one of said surfaces being in contact with an anode and the other of said surfaces being in contact with a cathode of different adjacent cells, said intercell connectors having peripheries extending beyond the borders of said anodes and said cathodes and being sealed together through intermediate closed loops of thermoplastic material, said battery having an OCV below the value at which the copper will be oxidized by the manganese dioxide in the presence of the lithium.

8. A laminar battery, comprising a thin flat sheet of metal having at least one external copper surface, a cathode slurry deposit of $MnO_2$ and carbon in a solution of a lithium salt in an organic solvent on and in intimate contact with a central region of said copper surface, a separator extending over said cathode slurry deposit, a lithium anode in contact with a central region of said separator on a side of said separator opposite said cathode slurry deposit, and means forming a sealed compartment about said anode, said cathode slurry deposit, and said separator, said battery having been electrically drained promptly after electrochemical assembly to an OCV below the value at which said copper surface will be oxidized by said $MnO_2$ in the presence of lithium.

9. A laminar battery, comprising a first thin sheet of metal foil having at least one external copper surface, a deposit of a slurry of $MnO_2$ and carbon in a solution of a lithium salt in an organic solvent on a central region of said copper surface, a separator over and in contact with said slurry deposit, a lithium foil anode in contact with said separator on a side of said separator opposite said slurry deposit, said anode being laminated to a central region of a nodular copper surface formed on a second thin sheet of metal foil confronting said first sheet, and a thermoplastic frame between and laminated to said first and second sheets around the peripheries thereof surrounding said anode, said cathode slurry deposit, and said separator, in which said battery has been electrically drained to an OCV below the value at which copper will be oxidized by $MnO_2$ in the presence of lithium before any substantial oxidation of copper has occurred.

* * * * *